United States Patent [19]

Duffy

[11] Patent Number: 4,680,863
[45] Date of Patent: Jul. 21, 1987

[54] HAND SAWS

[76] Inventor: Thomas F. Duffy, Box 320, R.D. 1, Owego, N.Y. 13825

[21] Appl. No.: 753,125

[22] Filed: Jul. 9, 1985

[51] Int. Cl.$^4$ .............................................. B21D 39/00
[52] U.S. Cl. ........................................ 30/511; 30/507
[58] Field of Search .................... 30/166 R, 506, 507, 30/508, 509, 510, 511, 513

[56] References Cited

U.S. PATENT DOCUMENTS

| | | | |
|---|---|---|---|
| 1,028,230 | 6/1912 | Leonard | 30/508 |
| 1,245,345 | 11/1917 | Howell | 30/507 |
| 1,565,861 | 12/1925 | McIntire | 30/512 |
| 1,695,231 | 12/1928 | Egan | 30/511 |
| 2,580,896 | 1/1952 | Dohner | 30/506 |
| 2,782,821 | 2/1957 | Gunnerson | 30/510 |

Primary Examiner—Frederick R. Schmidt
Assistant Examiner—Maurina Rachuba

[57] ABSTRACT

A hacksaw frame has a plurality of pivotally mounted fingers of different lengths to allow a blade to be mounted in a variety of different positions. Lever means for providing increased blade tension are disclosed.

10 Claims, 14 Drawing Figures

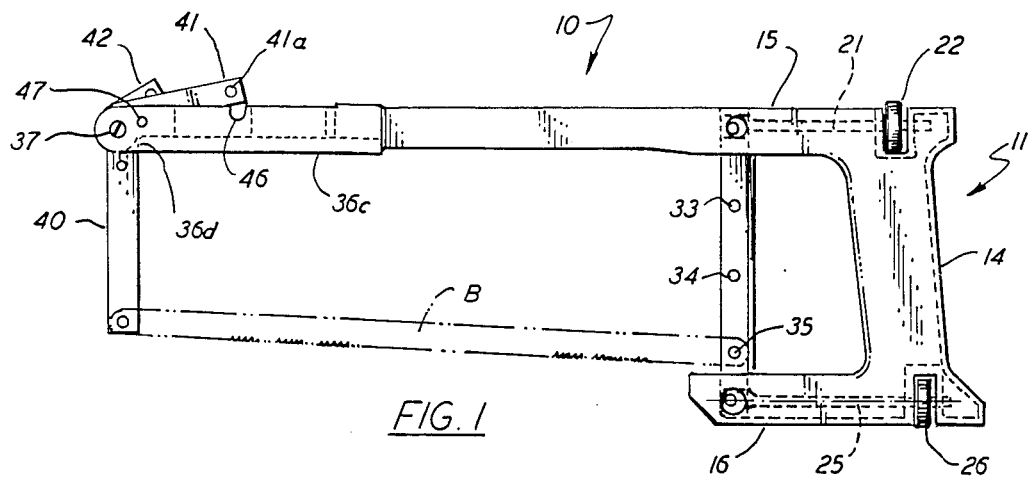
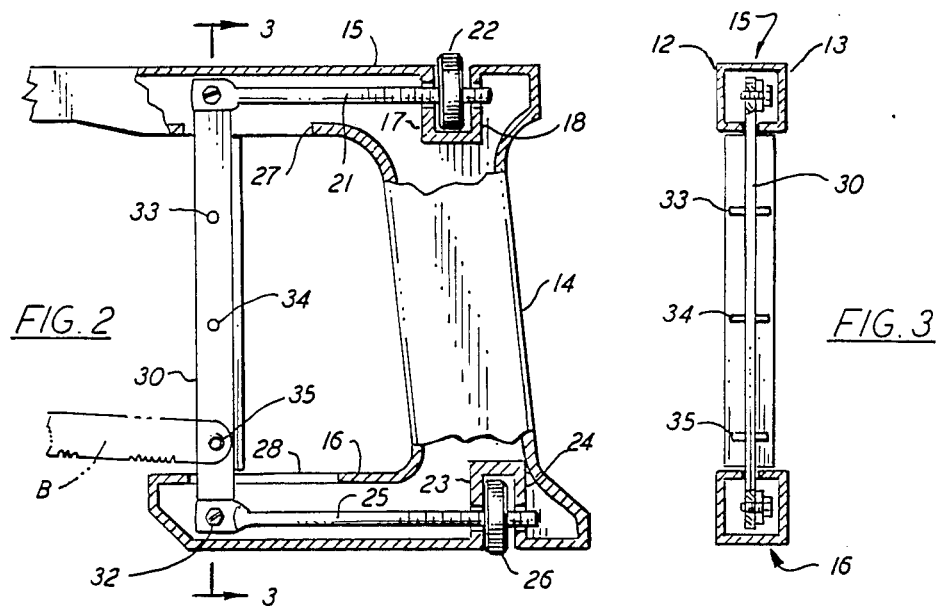
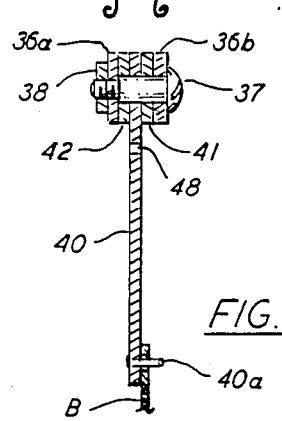
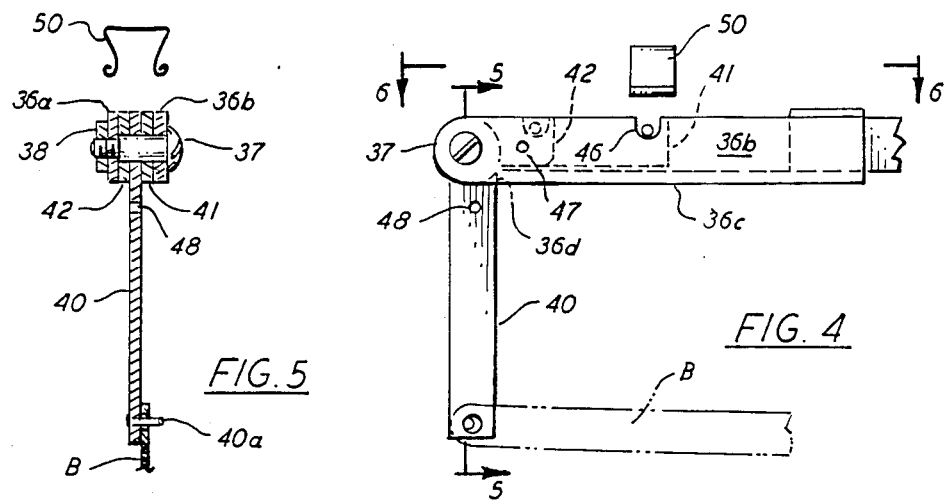

HAND SAWS

My invention relates to handsaws, and more particularly, to a handsaw frame adjustable to accommodate a wide variety of cutting operations.

RELATED PRIOR ART

The following prior U.S. Pat. Nos. may be of interest: 1,206,638, 1,245,345, 1,394,174, 1,522,598, 2,173,365, 2,514,880, 2,662,567.

One broad object of the present invention is to provide an improved hacksaw frame on which a blade may be positioned at a variety of different angles and spacings relative to the frame, to accommodate a variety of different cutting operations. Some sawing operations require that the blade be mounted close to the back of a generally U-shaped frame to allow use of the saw in a confined area, while other operations require that the blade be spaced farther from the back of the frame, to allow cutting entirely through a workpiece or other object having a given thickness. The broad idea of providing plural mounting positions for a blade on a hacksaw frame is by no means new, and various means for accomplishing that purpose are shown in the above-listed prior patents.

One important object of the invention is to provide an improved handsaw frame having a plurality of pivotable fingers which interchangeably form the distal limb of a generally U-shaped frame. By the use of such fingers, changing of a hacksaw from one blade configuration to another can be accomplished rapidly.

Proper cutting requires that the blade in a hacksaw be subjected to sufficient tension, and virtually all prior hacksaw frames incorporate some form of threaded bolt means to apply tension to a hacksaw blade by rotation of a knurled nut or a wing nut, for example. The blade tensioning arrangements used in most hacksaw frames with which I am familiar are not capable of applying the tension needed for some sawing applications if their knurled nut, wing nut or like device is simply turned by hand, and instead the user must tighten (and loosen) such devices using pliers. Another object of the present invention is to provide a handsaw frame having improved blade tensioning means which will allow greater tension to be applied to and released from a hacksaw blade by simple finger tightening, obviating any need for use of pliers.

Other objects of the invention will in part be obvious and will in part appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 1 is a side view of a preferred embodiment of the present invention;

FIG. 2 is an enlarged side view of the handle or proximal portion of the embodiment of FIG. 1, with certain portions cut away;

FIG. 3 is a cross-section view taken at lines 3—3 in FIG. 2;

FIG. 4 is an enlarged side view of a portion of the remote or distal end of the embodiment of FIG. 1;

FIG. 5 is a cross-section elevational view taken at lines 5—5 in FIG. 4;

Figure 6:
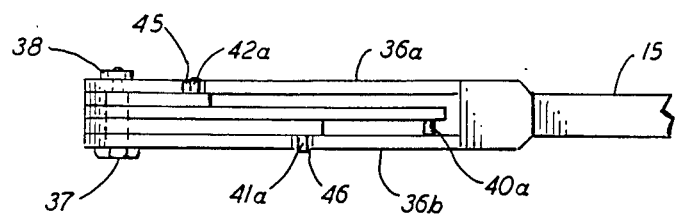
FIG. 6 is a top view taken at lines 6—6 in FIG. 4.

Referring now to FIGS. 1-3, the improved handsaw frame 10 is shown as including a proximal or handle portion 11 comprising two cast pieces 12,13 welded together to form a hollow, generally U-shaped handle member having a hand grip portion 14, an upper leg portion 15, and a lower leg portion 16. The walls 17,18 of a slot formed in upper leg 15 carry holes through which a partially-threaded rod 21 extends, with rod 21 rotatably supporting a threaded nut 22 within the slot. The cylindrical exterior surface of nut 22 is knurled. A portion of knurled nut 22 protrudes outside the slot in which that nut is mounted. By rotating nut 22 in one direction or the other, it will be apparent that the user may cause rod 21 to be translated leftwardly or rightwardly, as viewed in FIGS. 1 and 2. The walls 23,24 of a slot formed in lower leg 16 similarly carry holes through which a partially-threaded rod 25 extends, with rod 25 rotatably supporting a knurled threaded nut 26 within the slot, and by rotating nut 26 the user may cause rod 25 to be translated leftwardly or rightwardly, as viewed in FIGS. 1 and 2.

The lower side of upper leg 15 has a slot-like opening 27, and the upper side of lower leg 16 has a slot-like opening 28. A rigid lever member 30 pivotally connected to rod 21 at 31 extends through openings 27 and 28 and is pivotally connected to rod 25 at 32. Lever member 30 carries a plurality of pins (three are shown at 33, 34, 35) spaced apart along its length. A conventional hacksaw blade B may be positioned on the frame so that any one of the pins extends through the hole near the rear end of the blade.

Referring now to FIGS. 1 and 4-6, a distal member 36 rigidly affixed (as by welding) to the front end of upper leg 15 includes a pair of side plate portions 36a,36b, a bottom portion 36c, and a partially open top. A bolt 37 extends through the side plate portions and pivotally supports a plurality (three are shown at 40,41 and 42) of rigid fingers, with bolt 37 being retained by nut 38. The three pivotable fingers have mutually-differing lengths, finger 40 being shown as the longest and finger 42 as the shortest. Any of fingers 40-42 may be swung counterclockwise from a horizontal (in FIGS. 1 and 4) position in which it lies between side members 36a and 36b abutting bottom portion 36c, to a vertical (in FIGS. 1 and 4) limit position. In FIGS. 1 and 4 the longest finger 40 is shown swung to the vertical limit position. In FIG. 4 fingers 41 and 42 are shown at their clockwise limit positions, lying between side members 36a and 36b. In FIG. 1 fingers 41 and 42 are shown swung to positions intermediate the two limit positions, for sake of illustration. Counterclockwise rotation of any of the fingers is limited by an edge of the finger engaging front edge 36d of bottom member 36c.

Each of fingers 40—42 carries a respective pin extending from one side of the finger near the end of the finger, such pins being shown at 40a, 41a, and 42a, as best seen in FIG. 6. Small notches are shown provided at 45,46 in the upper edges of side plate members 36a,36b to allow fingers 41 and 42 to be swung clockwise far enough that they do not extend above side plate members 36a,36b. In FIGS. 1 and 5 a small hole through side member 36b is shown at 47. Similar holes may be provided through fingers 40-42 and a threaded hole side members 36a, such a hole through finger 40 being shown at 48 in FIG. 5. The holes are located at the same radial distance from the axis of bolt 37, so that they all register with each other if all of the fingers are rotated to their clockwise limit positions. Inserting a threaded bolt (not shown) through the holes then will prevent any of the fingers 40-42 from swinging away from its clockwise limit position. If one of fingers 40-42 is swung to the counterclockwise limit position, the bolt can be passed through the side members and the remaining fingers to keep the remaining fingers at their clockwise limit positions. Thus bolt 37 and nut 38 may allow very easy rotation of all of fingers 40-42, for easy selection of which finger is to be used, but the use of the bolt will prevent the then unused fingers from flopping away from their clockwise limit positions. Alternatively to provision of such holes for passage of a bolt, a conventional spring clip 50 (FIGS. 4 and 5) may be provided, to extend between and grip side members 36a and 36b and prevent rotation of unused fingers from their positions between the side members.

By moving selected ones of fingers 40-42 to the vertical or working position, and by selecting various of the pins on lever member 30, it will be seen that a hacksaw blade B may be mounted on the saw frame in a variety of different positions, a number of which are illustrated in FIGS. 9a-9f. The pins 33-35 are preferably spaced apart on lever member 30 substantially in accordance with the difference in the lengths of various of the fingers 40-42, to provide saw configurations such as those shown in FIGS. 9a-9c, wherein the blade B extends substantially parallel to the upper portion of the frame formed by leg 15 and distal member 36.

Figure 9D:
FIGS. 9a to 9f are side elevation views depicting the embodiment of FIGS. 1-6 with a blade fitted into a variety of different positions.
Figure 9E:
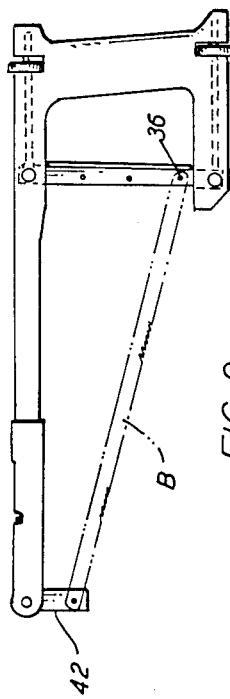
Figure 9F:
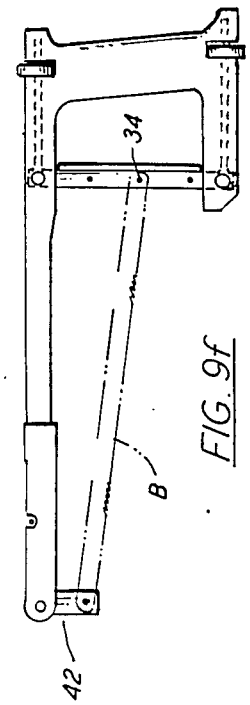
Figure 9A:
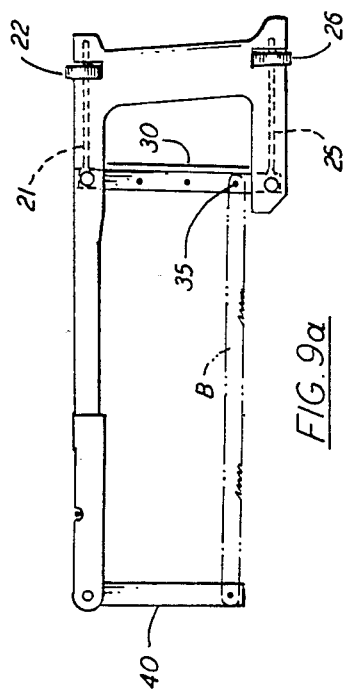
Figure 9B:
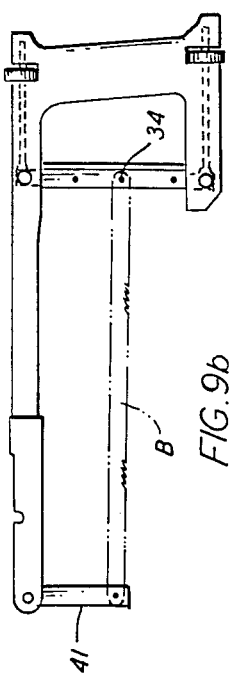

Referring now to FIG. 9a, assume that nuts 22 and 26 have been rotated to move lever member 30 sufficiently leftwardly that an end of blade B may be easily hooked onto lower pin 35, and that tension then must be applied to the blade. The operator then may rotate lower nut 26, pulling the lower end of lever 30 rightwardly. As he does so, that will be seen to apply a counterclockwise moment to lever 30, tending to pivot that lever about pin 35 until substantial tension exists in blade B, in rod 25, and in rod 21. Assume that he turns nut 26 as much as he can conveniently do so with his fingers. He will be able to rotate nut 26 with his fingers until a given amount of tension occurs in rod 25. Solely by finger-rotating nut 26, the user can apply an amount of blade tension comparable to that obtainable by finger operation in various prior art saws, but as previously mentioned, that amount of tension is insufficient in some applications, requiring further plier tightening of the prior devices.

After the user has rotated nut 26 to provide substantial blade tension, a portion of that tension is applied to rod 25 and a portion to rod 21. Because the lever arm distance between pin 35 and rod 25 is much smaller than the lever arm distance between pin 35 and rod 21, far more tension will exist in rod 25 than in rod 21. Because much less tension exists in rod 21, it will be apparent that the user then can rotate upper nut 22 with his fingers, applying much greater tension to the blade. If he rotates nut 22 as much as he can by using his fingers, the tension in blade B (and that in rod 25) will become far, far greater than what he could possibly accomplish by rotating nut 26 alone.

Figure 9C:
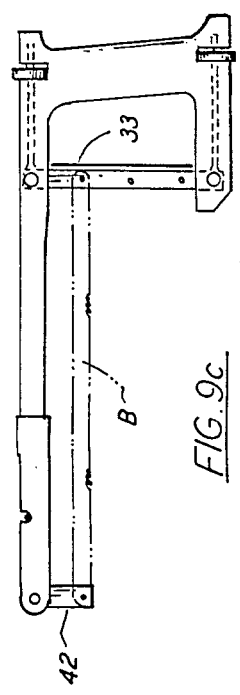

If a blade is instead connected to pin 33, as in FIG. 9c, the proper blade tightening process would involve first rotating upper nut 22 and lastly rotating lower nut 26. If the blade is connected near the midpoint of lever 30, as on pin 34 in FIG. 9b, nuts 22 and 26 can be successively tightened in either order.

Figure 7:
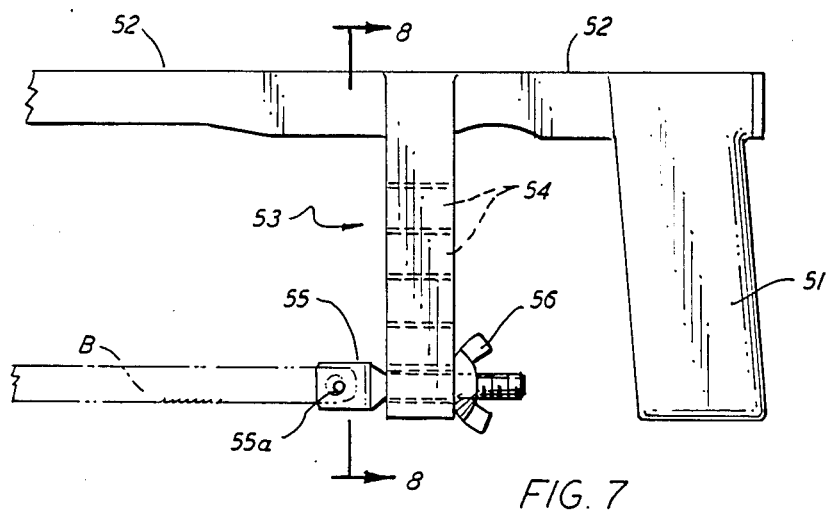
FIG. 7 is a side elevation view of the handle portion of an alternative embodiment of the invention.
Figure 8:
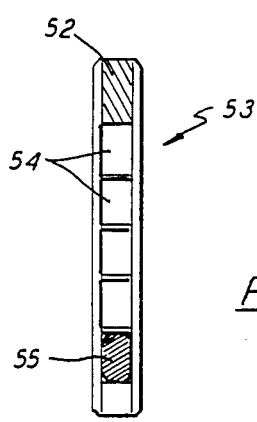
FIG. 8 is a cross-section view taken at lines 8—8 in FIG. 7.

FIGS. 7 and 8 illustrate the handle end of a modified embodiment. It is to be understood that this embodiment may employ a distal end of the type illustrated in FIGS. 4-6. In FIG. 7 the handle portion comprises a grip portion 51, a rigid upper member 52 which extends out to engage the distal portion (not shown), and a rear blade retaining member 53, which is rigidly affixed to member 52 and extends from member 52 roughly parallel to handle grip portion 51. Member 53 includes a plurality (five are shown) of through slots 54,54, through any of which threaded bolt member 55 may be caused to extend, the bolt member being shown extending through the lowermost of the slots in FIGS. 7 and 8. The head of bolt member 55 carries a pin 55a on which the rear end of a conventional hacksaw blade may be hung, and tension then may be applied to the blade by rotation of wing nut 56. The height of each through slot 54 exceeds its width, and unthreaded flat surfaces are provided on both sides of bolt 55, with the distance between the two flat surfaces only slightly exceeding the width of slots 54, so that bolt 55 will slide in a slot 54 without rotating as wing nut 56 is tightened. It will be understood that bolt 55 is inserted in different ones of slots 54 when different respective ones of the fingers 40-42 are selected to retain the forward end of the blade.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. In a hand saw frame haing a rigid upper frame member, hand grip means, and adjustable blade retaining means affixed to a proximal end of said upper frame member, the improvement comprising a plurality of individual fingers of differing lengths pivotally journalled at the distal end of said upper frame member, each individual finger pivotable between a storage position in which it extends substantially parallel to said upper frame member and an operating position in which it extends substantially perpendicular to said upper frame member, each of said individual fingers carrying a pin to engage the end of a saw blade.

2. The frame according to claim 1 having stop means to limit pivotal movement of said individual fingers in both directions.

3. The frame accoring to claim 1 wherein said individual fingers are pivotally mounted side by side on a pivot shaft means to pivot about a common axis.

4. The frame of claim 1 wherein said adjustable blade retaining means comprises a slotted member rigidly affixed to and extending generally perpendicularly from said upper frame member, said slotted member having a plurality of through slots extending, generally parallel to said upper frame member, and threaded bolt means selectively extensible through any of said slots, said bolt means carrying a pin to engage the proximal end of the saw blade.

5. The frame of claim 1 wherein said adjustable blade retaining means comprises a lever member, first means for adjusting the position of a first end of said lever member, second means for adjusting the position of the opposite end of said lever member, said lever member having at least one pin spaced in between said ends of said lever member and adapted to engage the proximal end of the saw blade.

6. The frame according to claim 1 in which a distal portion of said individual upper frame member includes a recess in which said fingers may fit in said storage position.

7. The frame of claim 5 wherein said first means comprises a threaded rod attached to said first end of said lever member, and nut means engaging said threaded rod.

8. The frame of claim 5 wherein said lever member has a plurality of pins spaced apart along its length, each of said pins being adapted to engage the proximal end of the saw blade.

9. The frame of claim 5 wherein said hand grip means comprises a generally U-shaped member having hollow upper and lower leg portions, said first means for adjusting the position of said first end of said lever member comprises a threaded rod extending within one of said leg portions, and said second means for adjusting the position of said opposite end of said lever member comprises a threaded rod extending within the other of said leg portions.

10. The frame of claim 7 wherein a plurality of said pins on said lever member are located on said lever member in relation to the pins on said fingers of mutually differing lengths that a saw blade may be positioned to extend substantially parallel to said upper frame member at a plurality of different distances from said upper frame member.

* * * * *